United States Patent
Junge

(10) Patent No.: US 10,712,073 B2
(45) Date of Patent: Jul. 14, 2020

(54) TERNARY NATURAL REFRIGERANT MIXTURE THAT IMPROVES THE ENERGY EFFICIENCY OF A REFRIGERATION SYSTEM

(71) Applicant: Haier US Appliance Solutions, Inc., Wilmington, DE (US)

(72) Inventor: Brent Alden Junge, Evansville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 223 days.

(21) Appl. No.: 15/446,050

(22) Filed: Mar. 1, 2017

(65) Prior Publication Data
US 2018/0252459 A1    Sep. 6, 2018

(51) Int. Cl.
*F25D 11/02* (2006.01)
*C09K 5/04* (2006.01)
(Continued)

(52) U.S. Cl.
CPC .......... *F25D 11/022* (2013.01); *C09K 5/042* (2013.01); *F25B 5/00* (2013.01); *F25B 40/00* (2013.01);
(Continued)

(58) Field of Classification Search
CPC ............... F25B 41/06; F25B 2309/002; F25B 2341/062; F25D 11/02; F25D 11/022; C09K 5/042
See application file for complete search history.

(56) References Cited

U.S. PATENT DOCUMENTS 4,482,465 A * 11/1984 Gray ............... C09K 5/044
                                                    252/67
6,274,062 B1 * 8/2001 Tieken ............ C09K 5/044
                                                    252/67
(Continued)

FOREIGN PATENT DOCUMENTS

CN         1174073 C        11/2004
WO     WO1997020902 A1     6/1997
(Continued)

OTHER PUBLICATIONS

Bharagava, et al., Experimental Study of Azeotropic Blend (30% Propane, 55% N-Butane, 15% Iso Butane) Refrigerant Flow Through The Serpentine Capillary Tube In Vapor Compression Refrigeration System, International Journal of Mechanical and Production Engineering Research and Development, vol. 3, Issue 1, Mar. 2013, pp. 9-18.
(Continued)

*Primary Examiner* — Jianying C Atkisson
*Assistant Examiner* — Miguel A Diaz
(74) *Attorney, Agent, or Firm* — Dority & Manning, P. A.

(57) ABSTRACT

The present invention provides a ternary natural refrigerant mixture containing R-600a (isobutane), R-600 (isobutane), and R-290 (propane) that can be used in single or dual evaporator refrigeration systems to provide for more energy efficient cooling than a single refrigerant such as R-134a without having to change the compressor design, which can add to manufacturing costs. For example, the ternary natural refrigerant mixture can be used in a refrigeration system that uses dual evaporators to provide more efficient cooling. The refrigeration system can be used in, e.g., a refrigerator having a fresh food compartment and a frozen food compartment to provide separate cooling to each compartment simultaneously.

5 Claims, 8 Drawing Sheets

(51) Int. Cl.
*F25B 40/00* (2006.01)
*F25B 5/00* (2006.01)

(52) U.S. Cl.
CPC .... *C09K 2205/12* (2013.01); *F25B 2341/062* (2013.01); *F25B 2400/052* (2013.01); *F25B 2400/054* (2013.01); *F25B 2400/12* (2013.01); *F25B 2400/23* (2013.01); *Y02P 20/123* (2015.11); *Y02P 20/124* (2015.11)

(56) References Cited

U.S. PATENT DOCUMENTS

| | | | | |
|---|---|---|---|---|
| 6,428,720 | B1* | 8/2002 | Roberts | C09K 5/045 252/67 |
| 6,991,743 | B2* | 1/2006 | Poole | C09K 5/045 252/67 |
| 8,739,567 | B2* | 6/2014 | Junge | F25B 5/02 62/335 |
| 2008/0075673 | A1* | 3/2008 | Knopeck | A61L 2/18 424/45 |
| 2008/0230738 | A1* | 9/2008 | Minor | A62D 1/0057 252/67 |
| 2009/0224199 | A1* | 9/2009 | Poole | C09K 5/045 252/68 |
| 2010/0163776 | A1* | 7/2010 | Robin | A62D 1/0057 252/2 |
| 2011/0115223 | A1* | 5/2011 | Stahlkopf | F01K 13/02 290/7 |
| 2012/0137724 | A1* | 6/2012 | Junge | F25B 5/02 62/498 |
| 2013/0327078 | A1* | 12/2013 | Junge | F25B 5/02 62/335 |
| 2014/0260409 | A1* | 9/2014 | Junge | F25B 5/02 62/419 |
| 2014/0298854 | A1* | 10/2014 | Junge | F25B 5/02 62/498 |
| 2015/0096325 | A1* | 4/2015 | Rivis | F25B 1/005 62/511 |
| 2015/0143836 | A1* | 5/2015 | Junge | F25B 39/02 62/335 |
| 2015/0300710 | A1* | 10/2015 | Junge | F25B 5/02 62/117 |
| 2016/0282031 | A1* | 9/2016 | Cernuschi | F25B 5/04 |
| 2017/0044412 | A1* | 2/2017 | Lindgren | C09K 5/042 |
| 2017/0130111 | A1* | 5/2017 | Kurita | C09K 5/045 |
| 2017/0219254 | A1* | 8/2017 | Sul | F25B 5/02 |
| 2018/0251665 | A1* | 9/2018 | Junge | C09K 5/045 |
| 2018/0264303 | A1* | 9/2018 | Robin | A62D 1/0092 |
| 2018/0320957 | A1* | 11/2018 | Cardella | F25J 1/001 |
| 2018/0347885 | A1* | 12/2018 | Avhale | F25D 29/00 |
| 2019/0093926 | A1* | 3/2019 | Haack | F25B 9/006 |

FOREIGN PATENT DOCUMENTS

WO WO-2009081672 A1 * 7/2009 ............ C09K 5/042
WO WO2009081673 A1 7/2009

OTHER PUBLICATIONS

Literature Survey, http://shodhganga.inflibnet.ac.in/bitstream/10603/26581/7/07_chapter2.pdf.

* cited by examiner

TERNARY NATURAL REFRIGERANT MIXTURE THAT IMPROVES THE ENERGY EFFICIENCY OF A REFRIGERATION SYSTEM

FIELD OF THE INVENTION

The subject matter of the present disclosure relates to a dual evaporator refrigerator system that utilizes dual evaporators and a ternary natural refrigerant mixture to improve the efficiency of the refrigeration system

BACKGROUND OF THE INVENTION

Energy efficiency is a key factor in designing refrigeration systems. However, at the same time, the increased cost of manufacturing more energy efficient refrigeration systems must be considered. Conventional refrigerator appliances commonly utilize a single evaporator, fan, and damper to move cooled air from the frozen food compartment containing the evaporator to the fresh food compartment. The position of the damper can be controlled depending upon whether cooling of the fresh food compartment is needed. One or more temperature sensors are utilized to measure temperature in one or more of the compartments.

Refrigeration systems that use dual evaporators rather than a single evaporator can be useful for removing heat from two different locations in a more energy efficient manner than single evaporator systems. For example, in a refrigerator appliance, a refrigeration loop can be provided that uses one evaporator to remove heat from the fresh food compartment and another evaporator to remove heat from the frozen food compartment. Such dual evaporator systems can be useful in e.g., avoiding temperature and/or humidity gradients that can occur with single evaporator systems.

Dual evaporator refrigeration systems can be costly and more complex than single evaporator refrigeration systems, where the increased cost of manufacturing can outweigh improvements in energy efficiency. Dual evaporator refrigeration systems can also incur cycling losses when switching operation from the fresh food evaporator to the freezer evaporator. Evaporators in such existing systems are also known to be relatively large, which can impact the storage volume of the appliance in which the refrigeration system resides. Some dual evaporator systems also utilize dual compressors, which further increases cost, noise and reliability concerns.

As such, dual evaporator refrigeration systems have been developed that provide for improved efficiency in operation and reduced complexity. Such refrigeration systems can cool multiple locations to different temperatures simultaneously. Nevertheless, there is room for improvement in the efficiency of these refrigeration systems. In this regard, a refrigerant that can provide for improved efficiency in the operation of dual evaporator refrigeration systems that cool multiple locations to different temperatures simultaneously without having to change the design of such a refrigeration system would also be useful.

BRIEF DESCRIPTION OF THE INVENTION

The present invention provides a refrigeration system that uses dual evaporators and a ternary natural refrigerant mixture to provide more efficient cooling. The refrigeration system can be used in e.g., a refrigerator having a fresh food compartment and a frozen food compartment to provide separate cooling for each compartment. Multiple exemplary embodiments are described including embodiments utilizing a single compressor and a single condenser with dual evaporators. Additional aspects and advantages of the invention will be set forth in part in the following description, or may be apparent from the description, or may be learned through practice of the invention.

In one exemplary embodiment, the present invention provides a ternary natural refrigerant mixture. The ternary natural refrigerant mixture includes a first natural refrigerant, a second natural refrigerant, and a third natural refrigerant. The first natural refrigerant, which is R-600a (isobutane), is present in an amount ranging from about 39 wt. % to about 49 wt. % based on the total weight of the ternary natural refrigerant mixture. The second natural refrigerant, which is R-600 (n-butane) is present in an amount ranging from about 39 wt. % to about 49 wt. % based on the total weight of the ternary natural refrigerant mixture, wherein the second natural refrigerant is R-600 (n-butane). The third natural refrigerant, which is R-290 (propane), is present in an amount ranging from about 10 wt. % to about 14 wt. % based on the total weight of the ternary natural refrigerant mixture.

In another exemplary embodiment, the present invention provides a refrigeration system that includes a ternary natural refrigerant mixture for circulation within the refrigeration system. The ternary natural refrigerant mixture includes a first natural refrigerant, a second natural refrigerant, and a third natural refrigerant. The first natural refrigerant, which is R-600a (isobutane), is present in an amount ranging from about 39 wt. % to about 49 wt. % based on the total weight of the ternary natural refrigerant mixture. The second natural refrigerant, which is R-600 (n-butane) is present in an amount ranging from about 39 wt. % to about 49 wt. % based on the total weight of the ternary natural refrigerant mixture, wherein the second natural refrigerant is R-600 (n-butane). The third natural refrigerant, which is R-290 (propane), is present in an amount ranging from about 10 wt. % to about 14 wt. % based on the total weight of the ternary natural refrigerant mixture. A compressor provides a pressurized flow of the ternary natural refrigerant mixture. A condenser is configured to receive and cool the flow of pressurized ternary natural refrigerant mixture. The condenser includes a divider for separating the flow of pressurized ternary natural refrigerant mixture into a first refrigerant stream and a second refrigerant stream. A first expansion device is in receipt of the first refrigerant stream from the condenser and is configured for reducing the pressure of the first refrigerant stream. A second expansion device is in receipt of the second refrigerant stream from the condenser and is configured for reducing the pressure of the second refrigerant stream. A first evaporator is configured to receive and evaporate at least a portion of the first refrigerant stream. A second evaporator is configured to receive and evaporate at least a portion of the second refrigerant stream. A junction combines the first refrigerant stream from the first evaporator with the second refrigerant stream from the second evaporator to provide an inlet refrigerant flow to the compressor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF THE INVENTION

Figure 1:
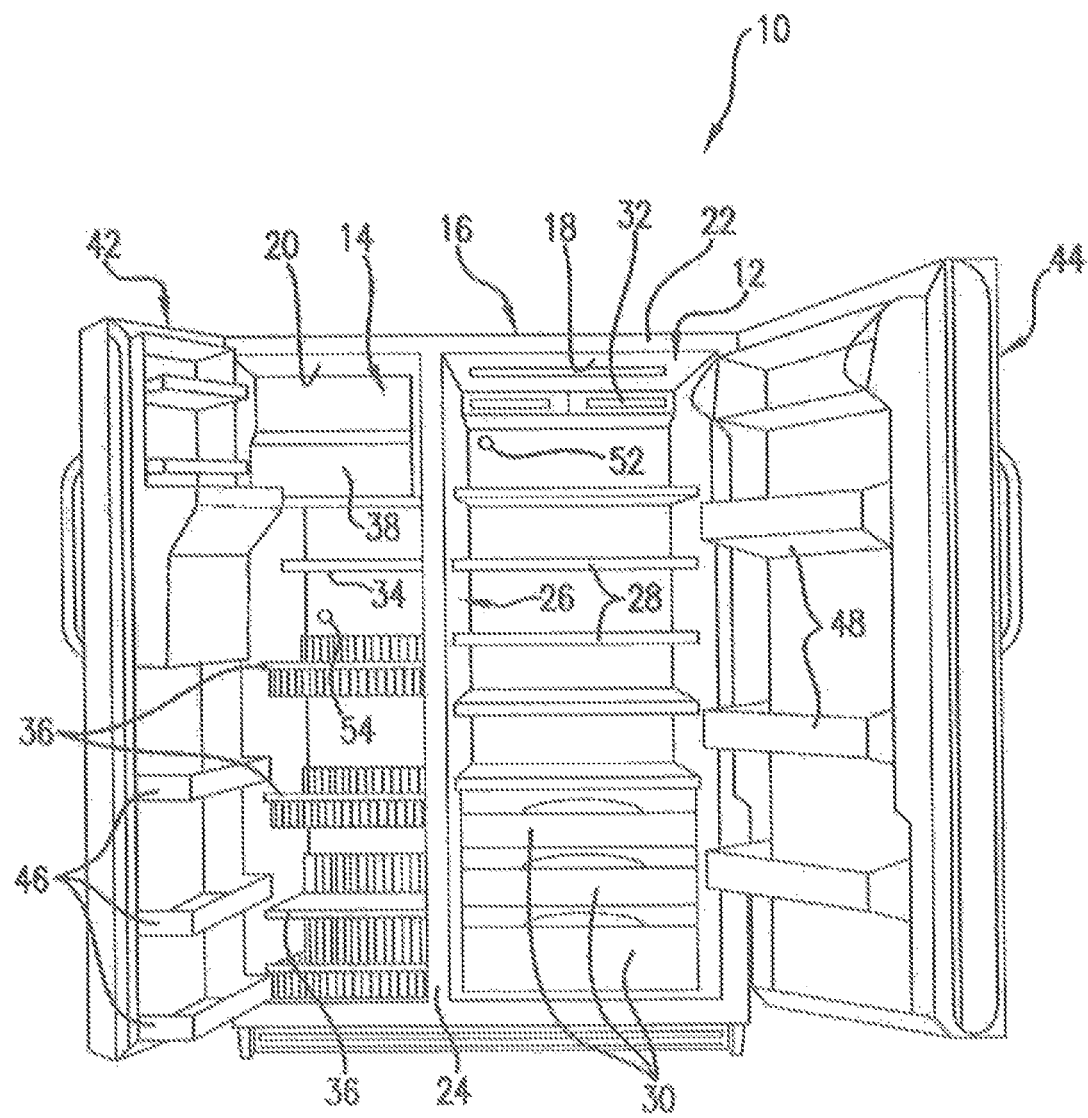
FIG. 1 illustrates an exemplary embodiment of a refrigerator appliance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present invention provides a ternary natural refrigerant mixture containing R-600a (isobutane), R-600 (isobutane), and R-290 (propane) that can be used in single or dual evaporator refrigeration systems to provide for more energy efficient cooling than a single refrigerant such as R-134a without having to change the compressor design of existing refrigeration systems, such as those designed for R-600a refrigerant, where such redesign would increase manufacturing costs. For example, the ternary natural refrigerant mixture can be used in a refrigeration system that uses dual evaporators to provide more efficient cooling. The refrigeration system can be used in, e.g., a refrigerator having a fresh food compartment and a frozen food compartment to provide separate cooling to each compartment simultaneously.

In one particular embodiment, the ternary natural refrigerant mixture includes a first natural refrigerant, a second natural refrigerant, and a third natural refrigerant. The first natural refrigerant, which is R-600a (isobutane), is present in an amount ranging from about 39 wt. % to about 49 wt. % based on the total weight of the ternary natural refrigerant mixture. The second natural refrigerant, which is R-600 (n-butane) is present in an amount ranging from about 39 wt. % to about 49 wt. % based on the total weight of the ternary natural refrigerant mixture, wherein the second natural refrigerant is R-600 (n-butane). The third natural refrigerant, which is R-290 (propane), is present in an amount ranging from about 10 wt. % to about 14 wt. % based on the total weight of the ternary natural refrigerant mixture.

In another embodiment, the first natural refrigerant is present in an amount ranging from about 40 wt. % to about 48 wt. % based on the total weight of the ternary natural refrigerant mixture, the second natural refrigerant is also present in an amount ranging from about 40 wt. % to about 48 wt. % based on the total weight of the ternary natural refrigerant mixture, and the third natural refrigerant is present in an amount ranging from about 11 wt. % to about 13 wt. % based on the total weight of the ternary natural refrigerant mixture.

In yet another embodiment, the first natural refrigerant is present in an amount ranging from about 42 wt. % to about 46 wt. % based on the total weight of the ternary natural refrigerant mixture, the second natural refrigerant is also present in an amount ranging from about 42 wt. % to about 46 wt. % based on the total weight of the ternary natural refrigerant mixture, and the third natural refrigerant is present in an amount ranging from about 11.5 wt. % to about 12.5 wt. % based on the total weight of the ternary natural refrigerant mixture.

As a result of charging a refrigeration system with the ternary natural refrigerant mixture of the present invention, the run time of the compressor used in the refrigeration system can be less than 65%. For instance, the run time of the compressor can range from about 60% to about 65%, such as from about 61% to about 64%, such as from about 62% to about 63%. In addition, refrigeration systems utilizing the ternary natural refrigerant mixture of the present invention can utilize from about 1% to about 5%, such as from about 1.5% to about 4.5%, such as from about 1.75% to about 4%, such as from about 2% to about 3% less energy than a refrigeration system charged with an R-134a refrigerant. Further, use of the ternary natural refrigerant mixture of the present invention does not require a change in the compressor design of refrigeration systems that utilize compressors that are compatible with an R-600a refrigerant, which reduces the cost of implementing use of the ternary natural refrigerant mixture of the present invention in various refrigeration systems.

FIG. 1 provides a front view of a representative refrigerator 10 that can cooled via the refrigeration system and ternary natural refrigerant mixture of the present invention. More specifically, for illustrative purposes, the present invention is described with a refrigerator 10 having a construction as shown and described further below. As used herein, a refrigerator includes appliances such as a refrigerator/freezer combination, side-by-side, bottom mount, compact, and any other style or model of a refrigerator. Accordingly, other configurations including multiple and different styled compartments could be used with refrigerator 10, it being understood that the configuration shown in FIG. 1 is by way of example only. Additionally, the refrigeration system of the present invention is not limited to a refrigerator appliance and can be used in other applications where dual evaporators are desirable as well such as e.g., where separate cooling at two or more locations is desired.

Refrigerator 10 includes a fresh food storage compartment 12 and a freezer storage compartment 14. Freezer compartment 14 and fresh food compartment 12 are arranged side-by-side within an outer case 16 and defined by inner liners 18 and 20 therein. A space between case 16 and liners 18 and 20, and between liners 18 and 20, is filled with foamed-in-place insulation. Outer case 16 normally is formed by folding a sheet of a suitable material, such as pre-painted steel, into an inverted U-shape to form the top and side walls of case 16. A bottom wall of case 16 normally is formed separately and attached to the case side walls and to a bottom frame that provides support for refrigerator 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel.

A breaker strip 22 extends between a case front flange and outer front edges of liners 18, 20. Breaker strip 22 is formed from a suitable resilient material, such as an extruded acrylo-butadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator 10 includes shelves 28 and slide-out storage drawers 30, sometimes referred to as storage pans, which normally are provided in fresh food compartment 12 to support items being stored therein.

Refrigerator 10 can be operated by one or more controllers (not shown) or other processing devices according to programming and/or user preference via manipulation of a control interface 32 mounted e.g., in an upper region of fresh food storage compartment 12 and connected with the controller. The controller may include one or more memory devices and one or more microprocessors, such as a general or special purpose microprocessor operable to execute programming instructions or micro-control code associated with the operation of the refrigerator. The memory may represent random access memory such as DRAM, or read only memory such as ROM or FLASH. In one embodiment, the processor executes programming instructions stored in memory. The memory may be a separate component from the processor or may be included onboard within the processor. As used herein, "controller" includes the singular and plural forms.

The controller may be positioned in a variety of locations throughout refrigerator 10. In the illustrated embodiment, the controller may be located e.g., behind an interface panel 32 or doors 42 or 44. Input/output ("I/O") signals may be routed between the control system and e.g., temperature sensors 52 and 54 as well as various operational components of refrigerator 10. These signals can be provided along wiring harnesses that may be routed through e.g., the back, sides, or mullion 24. Typically, through user interface panel 32, a user may select various operational features and modes and monitor the operation of refrigerator 10. In one embodiment, the user interface panel may represent a general purpose I/O ("GPIO") device or functional block. In one embodiment, the user interface panel 32 may include input components, such as one or more of a variety of electrical, mechanical or electro-mechanical input devices including rotary dials, push buttons, and touch pads. The user interface panel 32 may include a display component, such as a digital or analog display device designed to provide operational feedback to a user. The user interface panel may be in communication with the controller via one or more signal lines or shared communication busses.

A shelf 34 and wire baskets 36 are also provided in freezer compartment 14. In addition, an ice maker 38 may be provided in freezer compartment 14. A freezer door 42 and a fresh food door 44 close access openings to freezer and fresh food compartments 14, 12, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Refrigerator 10 includes a machinery compartment that can incorporate at least part of refrigeration cycle 100 that utilizes the ternary natural refrigerant mixture of the present invention, exemplary embodiments of which are depicted in each of FIGS. 2, 3, 4, and 5. Referring to FIGS. 2, 3, 4, and 5, for each embodiment, refrigeration cycle 100 includes a first evaporator 140 and a second evaporator 150. By way of example, first evaporator 140 can be used to cool frozen food (FZ) compartment 14 and second evaporator 150 can be used to cool fresh food (FF) compartment 12. A fan 152 can be used to circulate air in compartment 14 over first evaporator 140. Similarly, a fan 142 can be used to circulate air in compartment 12 over second evaporator 150. Alternatively, refrigeration system 100 can be used in other appliances where e.g., evaporators 140 and 150 are positioned in different locations where cooling to different temperatures is desired.

Each refrigeration system 100 depicted in the exemplary embodiments of FIGS. 2, 3, 4, and 5 is charged with the ternary natural refrigerant mixture of the present invention, which, as described above, includes a mixture of three natural refrigerants, namely R-600a (isobutane), R-600 (n-butane), and R-290 (propane) in the various weight percentages discussed above.

Still referring to FIGS. 2, 3, 4, and 5, in each embodiment compressor 104 receives an inlet refrigerant flow 130 (i.e., of the ternary natural refrigerant mixture) and provides for a flow of pressurized refrigerant 106 to condenser 108. Flow 106 and flow 130 are both in the form of a superheated vapor. However, the pressure of the superheated vapor in flow 106 is much higher than flow 130 and can be condensed into liquid in condenser 108.

In condenser 108, the pressurized flow from compressor 104 is cooled by e.g., exchanging heat with the environment of refrigeration system 100. For example, in the case of refrigerator 10, condenser 108 may exchange heat with ambient air from the room in which refrigerator 10 is located. Fan 170 may be used to flow air over e.g., coils, fins, and/or other elements making up condenser 108.

The ternary natural refrigerant mixture is separated in condenser 108 by a separating component 110, which may be a phase separator or a membrane. The phase separator or membrane 110 separates the ternary natural refrigerant mixture into a first refrigerant stream 112 and a second refrigerant stream 114. Each stream 112 and 114 has a different composition of the ternary natural refrigerant mixture. For example, refrigerant stream 112 could have a different ratio of R-600a to R-600 to R-290 than refrigerant stream 114. In one particular embodiment, the R-600a refrigerant can be present in an amount ranging from about 43 wt. % to about 47 wt. % based on the total weight of the first refrigerant stream, the R-600 refrigerant can be present in an amount ranging from about 38 wt. % to about 42 wt. % based on the total weight of the first refrigerant stream, and the R-290 refrigerant can be present in an amount ranging from about 13.5 wt. % to about 16.5 wt. % based on the total weight of the first refrigerant stream. Meanwhile, the R-600a refrigerant can be present in an amount ranging from about 40.5 wt. % to about 44.5 wt. % based on the total weight of the second refrigerant stream, the R-600 refrigerant can be present in an amount ranging from about 49 wt. % to about 53 wt. % based on the total weight of the second refrigerant stream, and the R-290 refrigerant can be present in an amount ranging from about 5 wt. % to about 8 wt. % based on the total weight of the second refrigerant stream.

In another embodiment, the R-600a refrigerant can be present in an amount ranging from about 43.5 wt. % to about 46.5 wt. % based on the total weight of the first refrigerant stream, the R-600 refrigerant can be present in an amount ranging from about 38.5 wt. % to about 41.5 wt. % based on the total weight of the first refrigerant stream, and the R-290 refrigerant can be present in an amount ranging from about 14 wt. % to about 16 wt. % based on the total weight of the first refrigerant stream. Meanwhile, the R-600a refrigerant can be present in an amount ranging from about 41 wt. % to about 44 wt. % based on the total weight of the second refrigerant stream, the R-600 refrigerant can be present in an amount ranging from about 49.5 wt. % to about 52.5 wt. % based on the total weight of the second refrigerant stream, and the R-290 refrigerant can be present in an amount ranging from about 5.5 wt. % to about 7.5 wt. % based on the total weight of the second refrigerant stream.

In still another embodiment, the R-600a refrigerant can be present in an amount ranging from about 44 wt. % to about 46 wt. % based on the total weight of the first refrigerant stream, the R-600 refrigerant can be present in an amount ranging from about 39 wt. % to about 41 wt. % based on the total weight of the first refrigerant stream, and the R-290 refrigerant can be present in an amount ranging from about 14.5 wt. % to about 15.5 wt. % based on the total weight of the first refrigerant stream. Meanwhile, the R-600a refrigerant can be present in an amount ranging from about 41.5 wt. % to about 43.5 wt. % based on the total weight of the second refrigerant stream, the R-600 refrigerant can be present in an amount ranging from about 50 wt. % to about 52 wt. % based on the total weight of the second refrigerant stream, and the R-290 refrigerant can be present in an amount ranging from about 6 wt. % to about 7 wt. % based on the total weight of the second refrigerant stream.

In any event, regardless of the particular ratio of the three natural refrigerants in the first refrigerant stream 112 and the second refrigerant stream 114, for the exemplary embodiment shown in FIGS. 2, 3, 4, and 5, separating component 110 can be configured as, e.g., a chamber or other element positioned at a location in the flow or refrigerant through condenser 108 where the refrigerant is part condensed liquid and part uncondensed vapor. Thus, separating component 110 is located between the inlet 116 and the outlet 118 of condenser 108 and likely at a location between the midpoint 117 and inlet 116 of the refrigerant flow through condenser 108. Separating component 110 therefore divides condenser 108 into a first portion 108a and a second portion 108b.

Separating component 110 is configured so the velocity of refrigerant passing through allows a liquid layer 120 to form at the bottom of component 110 due to the force of gravity and a vapor 122 rises to the top. The vapor 122 in separating component 110 continues into the second portion 108b of condenser 108 where it becomes a liquid having more of the lower vapor saturation temperature refrigerant that exits as first refrigerant stream 112. The liquid 120 from separating component 110 has more of the higher vapor saturation temperature refrigerant and exits condenser 108 as refrigerant stream 114.

Continuing with FIGS. 2, 3, 4, and 5, first expansion device 124 receives first refrigerant stream 112 from condenser 108. First expansion device 124 is configured to reduce the pressure of first refrigerant stream 112. Similarly, second expansion device 126 is configured to reduce the pressure of second refrigerant stream 114. In one exemplary embodiment of the present invention, expansion device 124 and/or 126 include a capillary tube as will be understood by one of skill in the art using the teachings disclosed herein. Other expansion devices may be used as well.

As already indicated, the above description applies to each of the exemplary embodiments of FIGS. 2, 3, 4, and 5. In the description that follows, each exemplary embodiment in such figures will now be described—particularly the differences between such exemplary embodiments.

Figure 2:
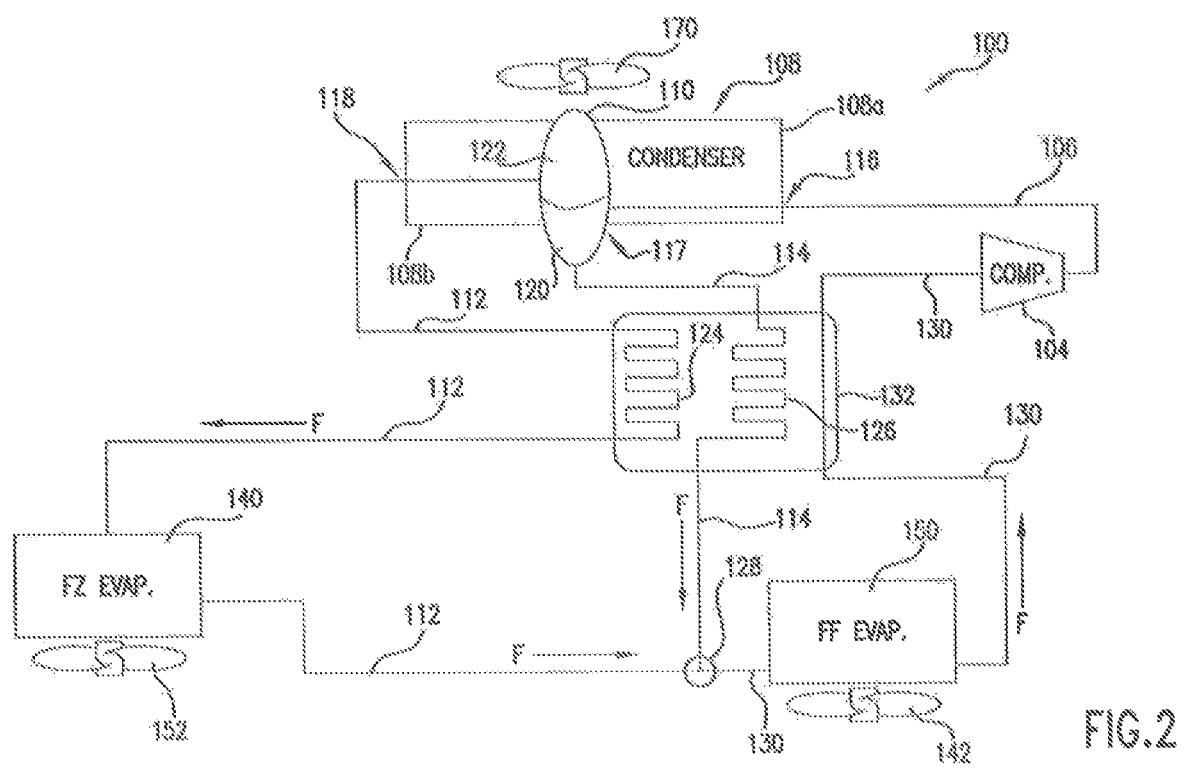
FIGS. 2, 3, 4, and 5 each illustrate a schematic of an exemplary embodiment of a refrigeration system of the present invention as may be used in e.g., a refrigerator appliance such as that shown in FIG. 1.

Continuing with FIG. 2, first evaporator 140 receives first refrigerant stream 112 from first expansion device 124 and operates to evaporate at least a portion of stream 112. This evaporation process provides cooling that can be used to e.g., remove heat from frozen food (FZ) compartment 14. A junction 128 joins first refrigerant stream 112 from first evaporator 140 and second refrigerant stream 114 form second expansion device 126 to create a combined refrigerant stream 130. Because streams 112 and 114 are at substantially the same pressure, these streams can be joined at junction 128 without special devices such as a valve or venturi.

Second evaporator 150 receives and evaporates at least a portion of the combined refrigerant stream 130 and provides the same as an inlet refrigerant flow 130 to compressor 104. The evaporation of combined refrigerant stream 130 in second evaporator 150 provides cooling that can be used to e.g., remove heat from fresh food (FF) compartment 12.

As indicated by block 132, first and second expansion devices 124 and 126 are in thermal communication with inlet refrigerant flow 130 to compressor 104 so as to cool first refrigerant stream 112 and second refrigerant stream 114. Block 132 may be e.g., a heat exchanger or a section where tubing making up devices 124, 126, and flow 132 are located near one another so as to promote the conduction of heat. Other configurations to exchange heat therebetween may be used as well. Compressor 104 is used to pressurize inlet refrigerant flow 130 from second evaporator 150 and repeat the cycle as previously described.

In addition to other advantages, the exemplary embodiment of refrigeration system 100 depicted in FIG. 2 can also provide advantages in the layout or construction of plumbing and/or components in a refrigerator appliance such as refrigerator 10.

Figure 3:
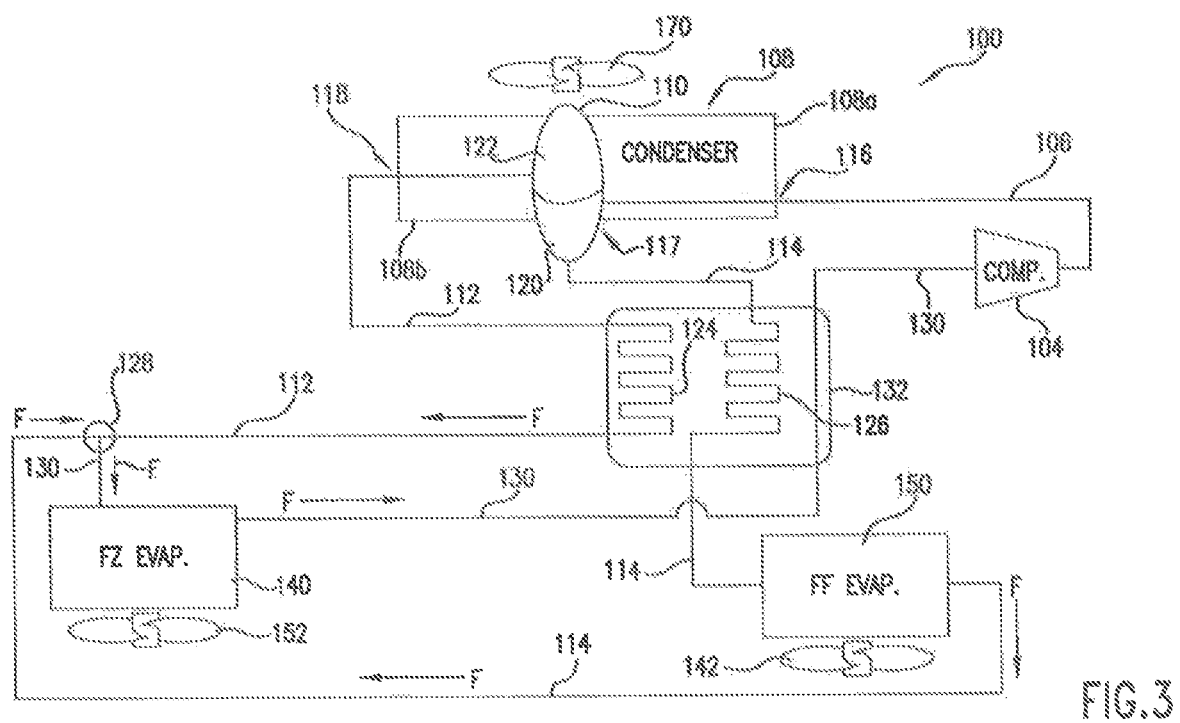

Turning now to FIG. 3, for this exemplary embodiment, first refrigerant stream 112 and second refrigerant stream 114 are received by first expansion device 124 and second expansion device 126, respectively, as previously described. Second evaporator 150 is configured to receive and evaporate at least a portion of the second refrigerant stream 114 from second expansion device 126 so as to provide cooling as previously described.

In this embodiment, junction 128 joins first refrigerant stream 112 from first expansion device 124 and second refrigerant stream 114 from second evaporator 150 to provide a combined refrigerant stream 130 to first evaporator 140. In turn, first evaporator 140 is configured to receive and evaporate at least a portion of combined refrigerant stream 130 and provide an inlet refrigerant flow 130 to compressor 104. As previously described, block 132 represents thermal communication between first and second expansion devices 124 and 126 and inlet refrigerant flow 130 so as to cool first refrigerant stream 112 and second refrigerant stream 114.

Compressor 104 is used to pressurize refrigerant flow 130 and repeat the cycle as previously described.

In addition to other advantages, the exemplary embodiment of refrigeration system 100 depicted in FIG. 3 can also provide advantages in the layout or construction of plumbing and/or components in a refrigerator appliance such as refrigerator 10. Also, the embodiment of FIG. 3 may be useful where, e.g., less cooling is required for fresh food FF compartment 12. Thus, some of the cooling capacity of first refrigerant stream 114 from second evaporator 150 is used in first evaporator 140 to cool e.g., the frozen food FZ compartment 14.

Figure 4:
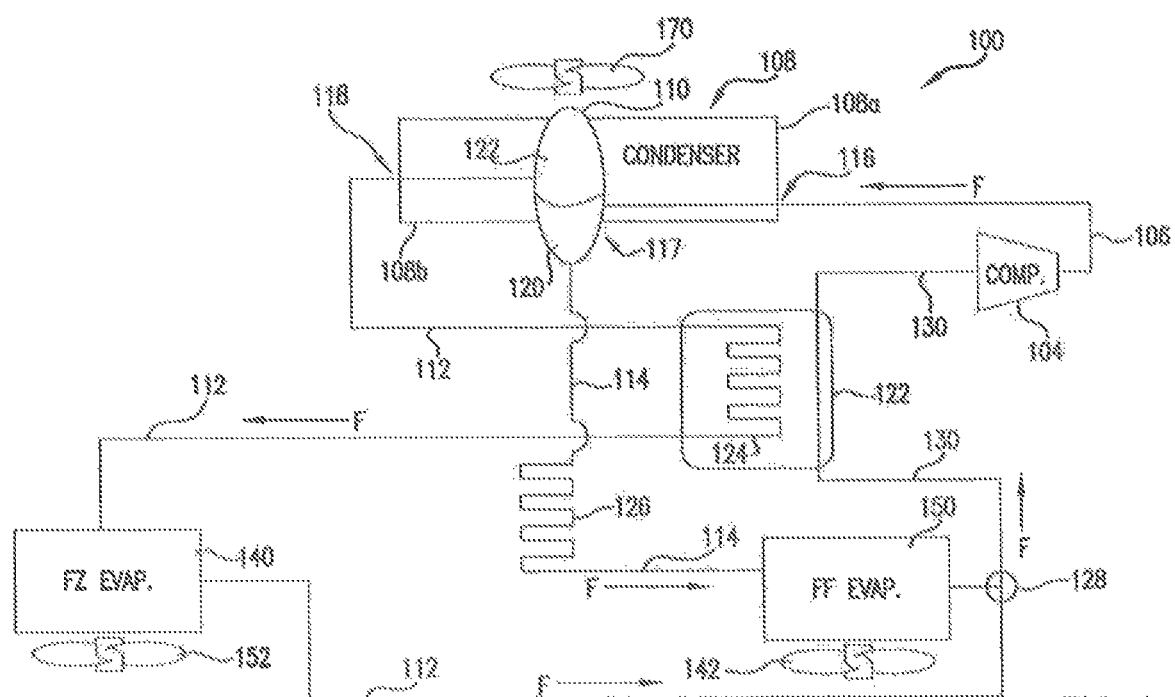

Referring now to the exemplary embodiment of system 100 as shown in FIG. 4, first refrigerant stream 112 and second refrigerant stream 114 are received by first expansion device 124 and second expansion device 126, respectively, as previously described. In this embodiment, first evaporator 140 is configured to receive and evaporate at least a portion of the first refrigerant stream 112 from first expansion device 124. Second evaporator 150 is configured to receive and evaporate at least a portion of the second refrigerant stream 114 from second expansion device 126. A junction 128 combines first refrigerant stream 112 from first evaporator 140 with second refrigerant stream 114 from second evaporator 150 to provide an inlet refrigerant flow 130 to compressor 104. Compressor 104 is used to pressurize inlet refrigerant flow 130 and repeat the cycle as previously described.

At block 122, first expansion device 124 is in thermal communication with inlet refrigerant flow 130 to compressor 104 but not with second expansion device 126. This configuration can allow a greater change in enthalpy for the refrigerant stream 112 to first evaporator 140 as it will be further cooled in first expansion device 124. Thus, for an appliance 10 where first evaporator 140 provides cooling to freezer compartment 14, more cooling can be provided to compartment 14. This will also result in less required refrigerant flow 112 to first evaporator 140 and but more for second evaporator 150 in e.g., fresh food compartment 12. Cooling with second evaporator 150 in the fresh food compartment 12 will likely be at a higher efficiency, however.

Figure 5:
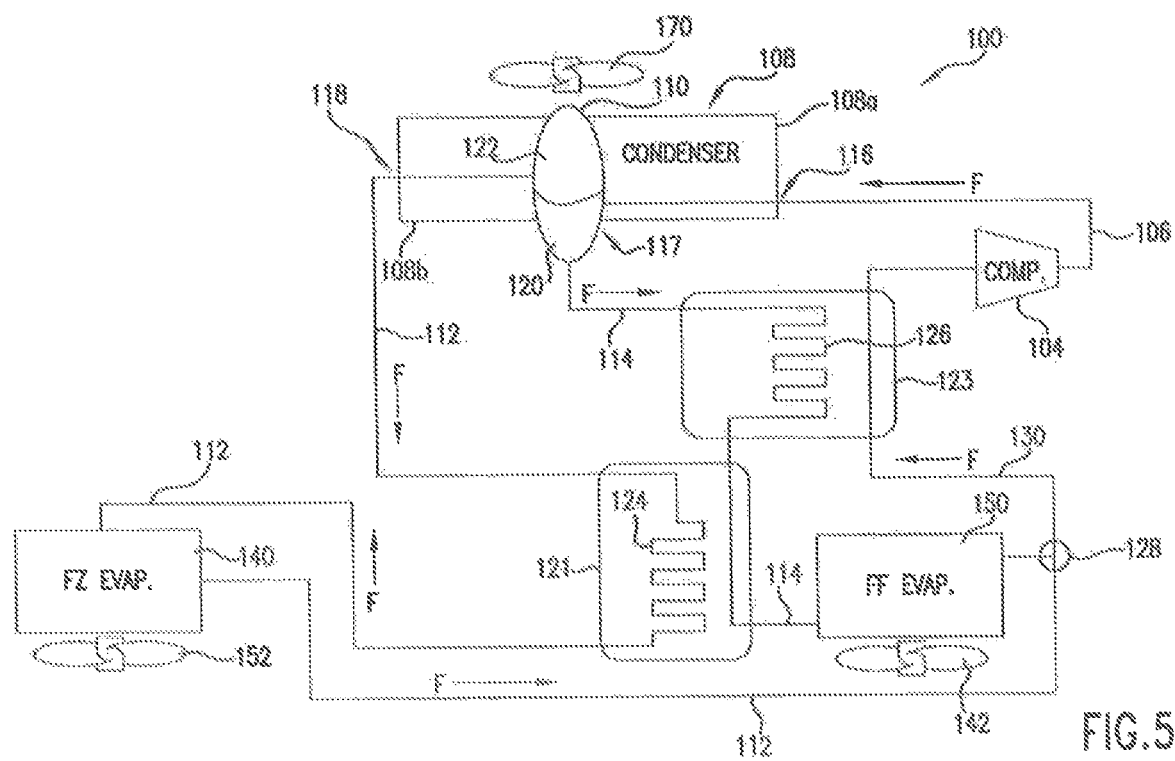

Referring to FIG. 5, in the this exemplary embodiment of refrigeration system 100, first refrigerant stream 112 and second refrigerant stream 114 are received by first expansion device 124 and second expansion device 126, respectively, as previously described. First evaporator 140 is configured to receive and evaporate at least a portion of the first refrigerant stream 112 from first expansion device 124. Second evaporator 150 is configured to receive and evaporate at least a portion of the second refrigerant stream 114 from second expansion device 126. A junction 128 combines first refrigerant stream 112 from first evaporator 140 with second refrigerant stream 114 from second evaporator 150 to provide an inlet refrigerant flow 130 to compressor 104. Compressor 104 is used to pressurize inlet refrigerant flow 130 and repeat the cycle as previously described.

As represented by block 123, second refrigerant stream 114 in second expansion device 126 is in thermal communication with the inlet refrigerant flow 130 to compressor 104 so as to cool second refrigerant stream 114. Additionally, as represented by block 121, first refrigerant stream 114 in first expansion device 124 is in thermal communication with second refrigerant stream 114 from second expansion device 126. System 100 as shown in FIG. 5 facilitates, e.g., the use of a high temperature glide refrigerant mixture because first refrigerant stream 112 in first expansion device 124 is further cooled by refrigerant stream 114 after stream 114 has passed through second expansion device 126. As such, the cooling capacity of refrigerant stream 114 travelling to second evaporator 150 in e.g., the fresh food (FF) compartment 12 is decreased while the cooling capacity of the refrigerant stream 112 travelling to first evaporator 140 in the frozen food (FZ) compartment 14 is increased. However, second evaporator 150 in the fresh food compartment 12 will provide cooling more efficiently.

In the exemplary embodiments described above, refrigeration system 100 can be constructed with fewer parts in that e.g., no damper, no refrigerant flow valve and no check valve are needed. The manufacturing of refrigeration system 100 can be simpler and more repeatable. Additionally, there are no cycling losses when switching refrigerant between fresh food and freezer evaporators as occurs in certain existing dual evaporator systems. Further, the split refrigerant flow can reduce the need for large evaporators because both evaporators are used simultaneously. The smaller evaporators can require less internal volume versus a traditional dual evaporator system. Further, the system 100 can eliminate issues with very short fresh food cooling cycles such as temperature and humidity management. It should be understood that although the ternary natural refrigerant mixture of the present invention is described for use with a dual evaporator refrigeration system that can cool multiple locations to different temperatures simultaneously, the ternary natural refrigerant mixture can also be used in any other dual evaporator refrigeration system (e.g., a system that does not cool multiple locations to different temperatures simultaneously) or in a single evaporator system in order to improve the efficiency and reduce the energy usage of such systems.

The ternary natural refrigerant mixture of n-butane (R-600), isobutane (R-600a), and propane (R-290) and its use in the refrigeration systems such as the refrigeration systems discussed with respect to FIGS. 1 to 5 may be better understood by reference to the following examples.

Example 1

In Example 1, a dual evaporator system with the ability to cool the freezer and fresh food compartments simultaneously was tested for its temperature performance when charged with one embodiment of the natural refrigerant blend of the present invention (e.g., 44 wt. % R-600, 44 wt. % R-600a, and 12 wt. % R-290 based on the total weight of the natural refrigerant blend). When using this natural refrigerant blend, the freezer evaporator theoretically received a refrigerant blend of 40 wt. %, R-600, 45 wt. % R-600a, and 15 wt. % R-290 based on the total weight of the natural refrigerant blend, while the fresh food evaporator theoretically received 51 wt. % R-600, 42.5 wt. % R-600a, and 6.5 wt. % R-290 based on the total weight of the natural refrigerant blend. Both the freezer and fresh food compartments were cooled simultaneously, resulting in better temperature and humidity control. The results are shown in FIGS. 6 to 10.

Figure 6:
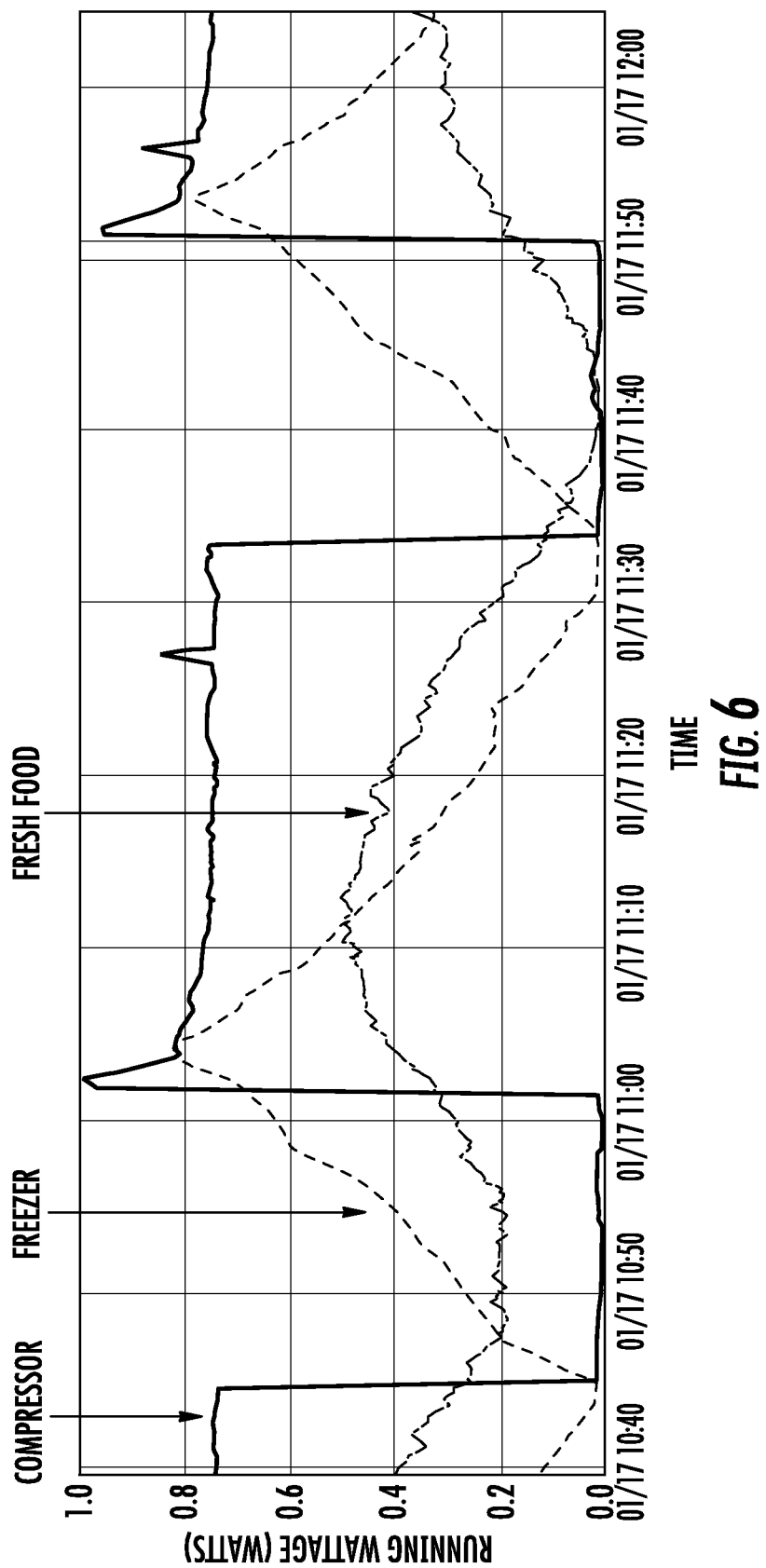
FIG. 6 is a graph of running wattage versus time showing the simultaneous cooling of the freezer and fresh food compartments of a dual evaporator system charged with the natural refrigerant blend of the present invention.

First, in FIG. 6, a graph of running wattage (in watts) versus time is shown while the compressor switches between running and not-running. As can be seen in FIG. 6, the refrigeration system is capable of simultaneously cooling the freezer and fresh food compartments through the use of a dual evaporator system charged with the natural refrigerant blend of the present invention. The freezer starts warming immediately in the compressor off cycle and continues to warm momentarily during the compressor on cycle while the evaporator is cooled and the fan start up is delayed. Meanwhile, the fresh food compartment exhibits a delayed response to both cooling in the compressor on cycle and warming in the compressor off cycle.

Figure 7:
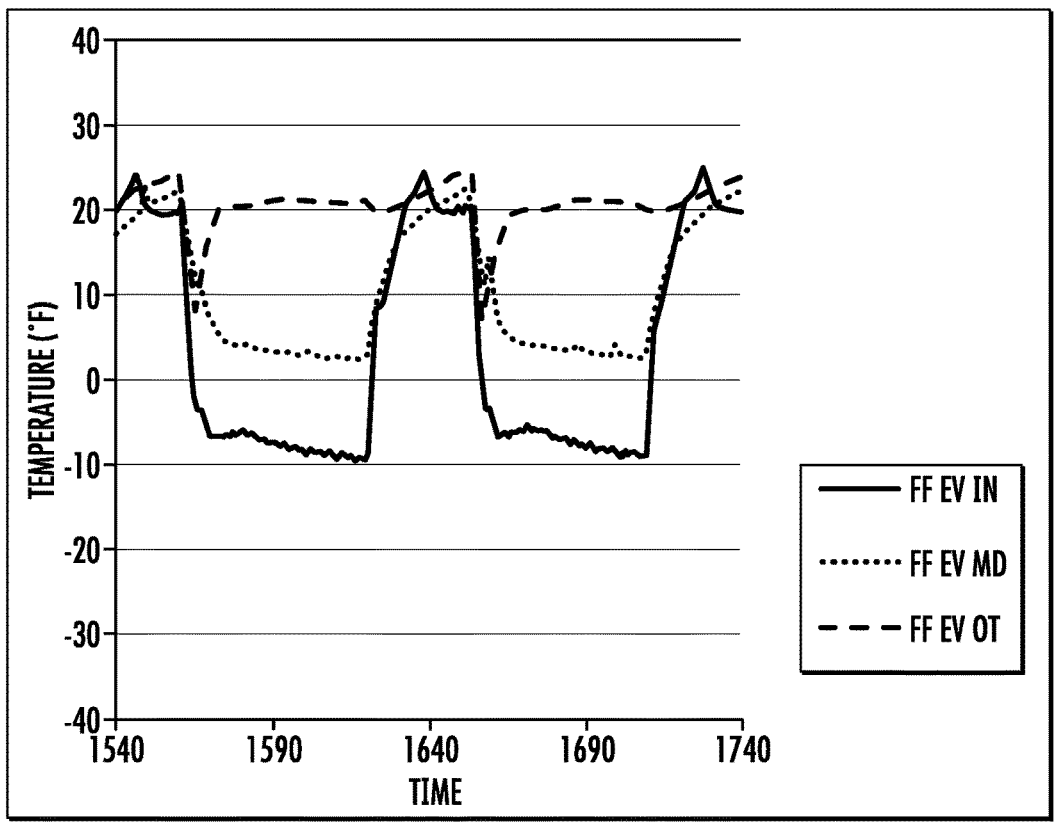
FIGS. 7 and 8 compare the temperature in degrees Fahrenheit of the fresh food evaporator and the freezer evaporator in the dual evaporator refrigeration system of the present invention when charged with a natural refrigerant blend of the present invention.
Figure 8:
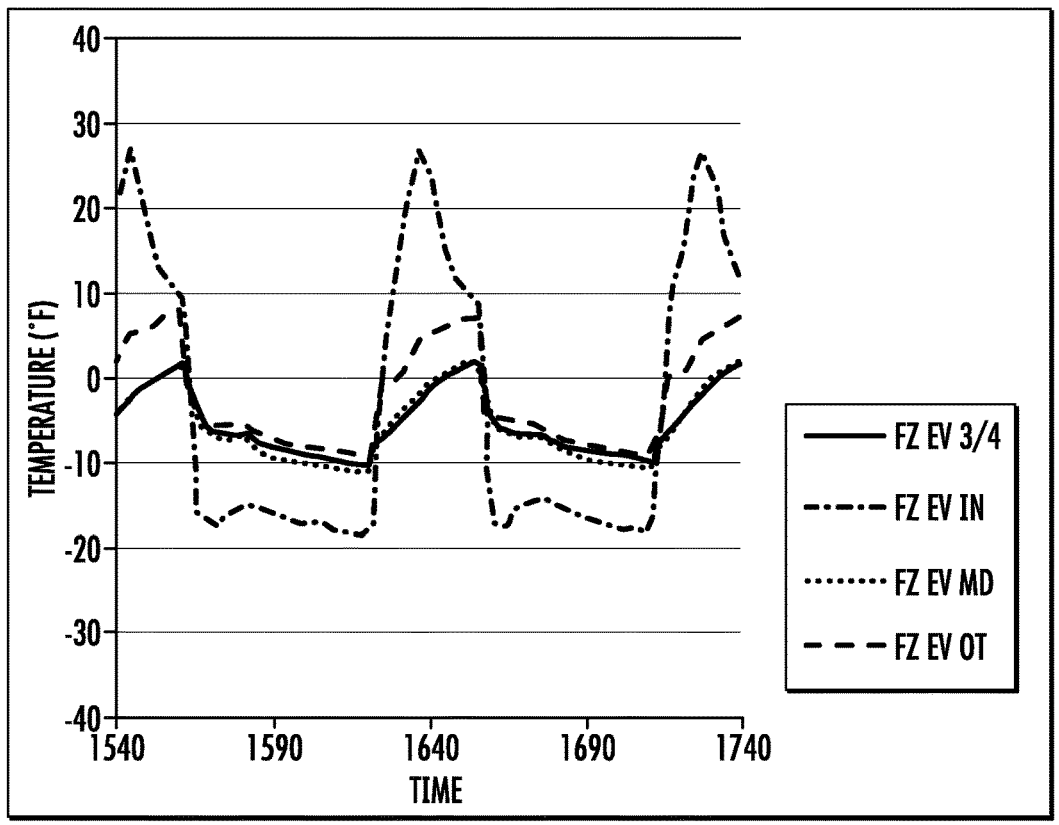

FIGS. 7 and 8 compare the temperature in degrees Fahrenheit of the fresh food evaporator and the freezer evaporator in the dual evaporator refrigeration system of the present invention when charged with a natural refrigerant blend of 44 wt. % R-600, 44 wt. % R-600a, and 12 wt. % R-290 based on the total weight of the natural refrigerant blend. FIG. 7 summarizes the temperature of the fresh food evaporator at the locations of in, middle, and out, while FIG. 8 summarizes the temperature of the freezer evaporator at the locations of in, middle, out, and ¾ between the in and out. As shown, the fresh food evaporator inlet operates at a temperature that is about 10 degrees Fahrenheit warmer than the freezer evaporator for reduced energy consumption.

Figure 9:
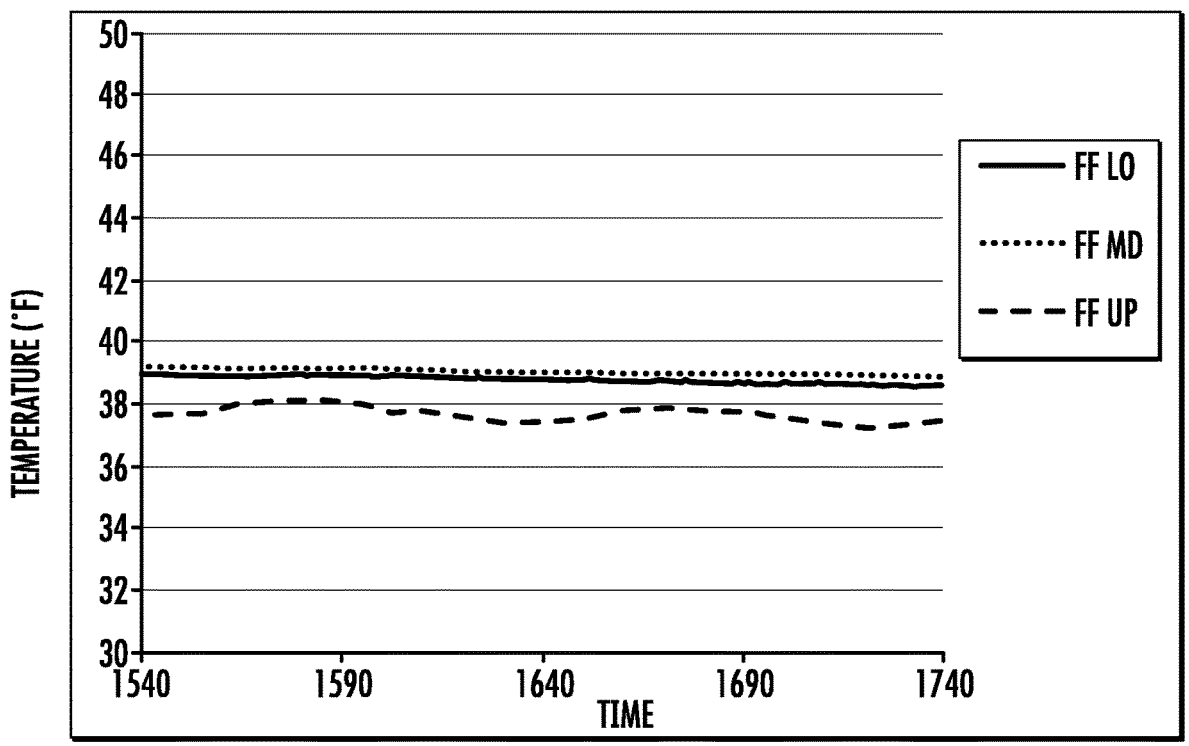
FIGS. 9 and 10 compare the temperature in degrees Fahrenheit of the fresh food compartment and the freezer compartment in the dual evaporator refrigeration system of the present invention.
Figure 10:
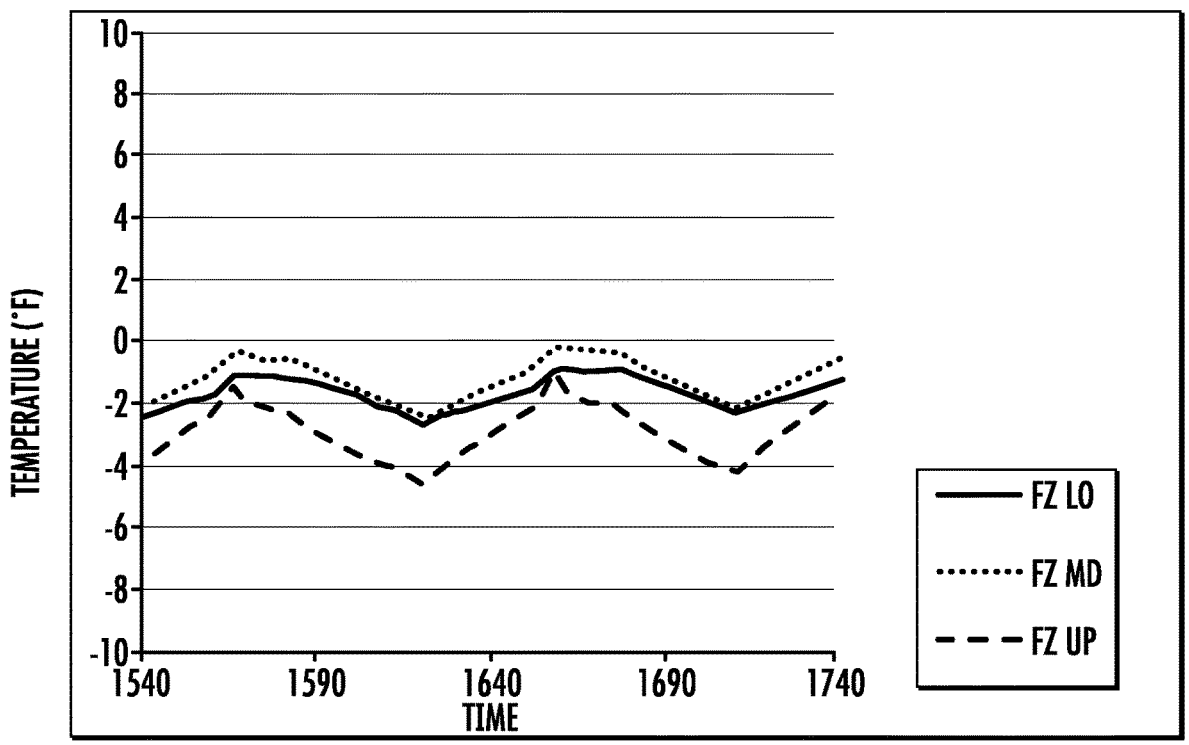

FIGS. 9 and 10 compare the temperature in degrees Fahrenheit of the fresh food compartment and the freezer compartment in the dual evaporator refrigeration system of the present invention when the system is charged with a natural refrigerant blend of 44 wt. % R-600, 44 wt. % R-600a, and 12 wt. % R-290 based on the total weight of the natural refrigerant blend. FIG. 9 summarizes the temperature of the fresh food compartment at the locations of lower shelf, middle shelf, and upper shelf, while FIG. 10 summarizes the temperature of the freezer compartment at the locations of lower shelf, middle shelf, and upper shelf. As shown, the fresh food compartment and the freezer compartment show consistency between the temperatures at the lower and upper shelves, indicating that the simultaneous cooling that occurs due to the use of the dual evaporator system and the natural refrigerant blend of the present invention behaves as predicted.

Example 2

In Example 2, the energy efficiency of 100% R-134a in a non-simultaneous dual evaporator system with an R-134a compressor, 100% R-134a in an interpolated simultaneous dual evaporator system with an R-134a compressor, and a natural refrigerant blend of 44% R-600, 44% R-600a, and 12% R-290 in a simultaneous dual evaporator system with an R-600a compressor were compared. The results are shown below in Table 1.

TABLE 1

| | Refrigerant and Refrigeration System Tested | | |
|---|---|---|---|
| | R-134a with Non-Simultaneous Dual Evaporator System | Interpolation to R-134a with Simultaneous Dual-Evaporator System | 44% R-600/44% R-600a/12% R-290 with Simultaneous Dual Evaporator System and R-600a Compressor |
| Power (On/Off) (Average Watts) | 69.30 | 68.02 | 65.1 |
| % Power Decrease Compared to R-134a | — | 1.28 | 4.2 |
| Power (Active) (Average Watts) | 105.75 | — | 104.40 |
| % of Time Compressor Running | 63.92 | — | 63.05 |

As shown in Table 1, the R-134a refrigerant in a non-simultaneous dual evaporator refrigeration system used 69.30 average watts of power, and when interpolated to estimate the energy use at the same compartment temperatures achieved in the natural refrigerant test the energy use dropped to 68.02 average watts of power. Meanwhile, the natural refrigerant blend of 44% R-600, 44% R-600a, and 12% R-290 in a simultaneous dual evaporator system with an R-600a compatible compressor used 65.1 average watts of power. In summary, the natural refrigerant blend showed an energy usage reduction of 4.2%. Further, when taking into account the improved efficiency of the compressor used in the simultaneous dual evaporator refrigeration system using an R-600a compressor, the energy usage reduction is between 2% and 3%.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A refrigeration system, comprising:
a natural refrigerant mixture for circulation within the refrigeration system comprising:
(a) a first natural refrigerant, wherein the first natural refrigerant is present in an amount ranging from 42 wt. % to 46 wt. % based on the total weight of the natural refrigerant mixture, wherein the first natural refrigerant is R-600a (isobutane),
(b) a second natural refrigerant, wherein the second natural refrigerant is present in an amount ranging from 42 wt. % to 46 wt. % based on the total weight of the natural refrigerant mixture, wherein the second natural refrigerant is R-600 (n-butane); and
(c) a third natural refrigerant, wherein the third natural refrigerant is present in an amount ranging from 10 wt. % to 14 wt. % based on the total weight of the natural refrigerant mixture, wherein the third natural refrigerant is R-290 (propane);
a compressor for providing a pressurized flow of the natural refrigerant mixture;
a condenser configured to receive and cool the flow of pressurized natural refrigerant mixture, the condenser comprising a divider for separating the flow of pressurized natural refrigerant mixture into a first refrigerant stream and a second refrigerant stream;
a first expansion device in receipt of the first refrigerant stream from the condenser and configured for reducing the pressure of the first refrigerant stream; and
a second expansion device in receipt of the second refrigerant stream from the condenser and configured for reducing the pressure of the second refrigerant stream;
a first evaporator configured to receive and evaporate at least a portion of the first refrigerant stream, wherein the first evaporator is used to cool a frozen food compartment of a refrigerator;

a second evaporator configured to receive and evaporate at least a portion of the second refrigerant stream, wherein the second evaporator is used to cool a fresh food compartment of the refrigerator; and a junction that combines the first refrigerant stream from the first evaporator with the second refrigerant stream from the second evaporator to provide an inlet refrigerant flow to the compressor, wherein the natural refrigerant mixture is distributed in differing amounts to the first evaporator via the first refrigerant stream and the second evaporator via the second refrigerant stream, wherein the first natural refrigerant is present in an amount ranging from 44 wt. % to 46 wt. % based on the total weight of the first refrigerant stream, the second natural refrigerant is, present in an amount ranging from 39 wt. % to 41 wt. % based on the total weight of the first refrigerant stream, and the third natural refrigerant is present in an amount ranging from 14.5 wt. % to 15.5 wt. % based on the total weight of the first refrigerant stream, and wherein the first natural refrigerant is present in an amount ranging from 41.5 wt. % to 43.5 wt. % based on the total weight of the second refrigerant stream, the second natural refrigerant is present in an amount ranging from 50 wt. % to 52 wt. % based on the total weight of the second refrigerant stream, and the third natural refrigerant is present in an amount ranging from 6 wt. % to 7 wt. % based on the total weight of the second refrigerant stream.

2. The refrigeration system of claim 1, wherein the compressor is designed for use with an R-600a refrigerant.

3. The refrigeration system of claim 1, wherein the third natural refrigerant is present in an amount ranging from 11 wt. % to 13 wt. % based on the total weight of the natural refrigerant mixture.

4. The refrigeration system of claim 1, wherein the second expansion device is in thermal communication with the inlet refrigerant flow to the compressor so as to cool the second refrigerant stream.

5. The refrigeration system of claim 1, wherein
the second expansion device is in thermal communication with the inlet refrigerant flow to the compressor so as to cool the second refrigerant stream, and
the first expansion device in in thermal communication with the second refrigerant stream from the second expansion device so as to cool the first refrigerant stream.

* * * * *